United States Patent [19]

Stautzenberger

[11] 3,862,218

[45] Jan. 21, 1975

[54] PURIFICATION OF TEREPHTHALIC ACID BY THERMAL TREATMENT

[75] Inventor: Adin L. Stautzenberger, Corpus Christi, Tex.

[73] Assignee: Celanese Corporation, New York, N.Y.

[22] Filed: Sept. 7, 1971

[21] Appl. No.: 178,512

Related U.S. Application Data

[63] Continuation of Ser. No. 780,269, Nov. 29, 1968, abandoned, which is a continuation-in-part of Ser. No. 705,600, Feb. 15, 1968, abandoned.

[52] U.S. Cl. ............................................. 260/525
[51] Int. Cl. ..................... C07c 63/26, C07c 51/42
[58] Field of Search ................................... 260/525

[56] References Cited
UNITED STATES PATENTS

| | | | |
|---|---|---|---|
| 2,317,455 | 4/1943 | Gubelmann et al. | 260/525 |
| 3,171,856 | 3/1965 | Kurtz | 260/525 |
| 3,364,256 | 1/1968 | Ichikawa et al. | 260/525 |
| 3,452,088 | 6/1969 | Olsen et al. | 260/525 |
| 3,456,001 | 7/1969 | Olsen | 260/525 |

*Primary Examiner*—Lorraine A. Weinberger
*Assistant Examiner*—Richard D. Kelly
*Attorney, Agent, or Firm*—Stewart N. Rice; Ralph M. Pritchett

[57] ABSTRACT

A process for purifying terephthalic acid (TPA) by heating the TPA and a liquid medium to above 325°C while maintaining a liquid phase except when the critical temperature is exceeded. The heated mixture is then cooled allowing the TPA to crystallize. The heating is preferably carried to a temperature such that no TPA remains in the solid phase. Catalysts may be used.

18 Claims, No Drawings

PURIFICATION OF TEREPHTHALIC ACID BY THERMAL TREATMENT

This application is a continuation of application Ser. No. 780,269 filed Nov. 29, 1968, which in turn is a continuation-in-part of application Ser. No. 705,600 filed Feb. 15, 1968, both are now abandoned.

BACKGROUND OF THE INVENTION

The present invention relates to the purification of terephthalic acid. More particularly, the present invention relates to the purification of terephthalic acid containing such impurities as 4-carboxybenzaldehyde.

Terephthalic acid is presently a very valuable industrial raw material because of its use in the manufacture of polyester synthetic fibers such as poly(ethylene terephthalate). However commercial production of these polyester fibers has generally not been by the direct esterification of terephthalic acid because of the adverse effects of small amounts of impurities in the terephthalic acid. Instead the terephthalic acid is usually esterified with methanol to form dimethyl terephthalate which is readily purified by distillation and which in turn is transesterified with the appropriate glycol and polymerized to form the polyester. Heretofore the conversion to dimethyl terephthalate has been considered necessary in order to eliminate the impurities in the terephthalic acid but it is readily apparent that it would be desirable to form the polyester directly from the terephthalic acid in order to eliminate the expensive and time consuming esterification, distillation and transesterification necessary when utilizing dimethyl terephthalate.

The adverse impurities in terephthalic acid are those arising during the course of its manufacture and therefore the particular impurities present may vary according to the process of manufacture. At the present time there are several methods for producing terephthalic acid such as by the oxidation of alkylbenzenes. These oxidations of alkylbenzenes may be conducted for example by oxidizing p-xylene in the liquid phase with 30 to 40% nitric acid at about 200°C, either with or without added air or oxygen. Another method for the oxidation of p-xylene is with an oxygen-containing gas (such as air) at temperatures around 150°C and in the presence of a heavy metal catalyst such as cobalt acetate or other Group VIII metal salts. This latter method is disclosed in U.S. Pat. Nos. 3,240,803, 3,171,856, 3,139,452, 3,119,860, 3,064,044, 3,004,066 and British Pat. No. 1,004,895. An alternative method for preparing terephthalic acid by the oxidation of alkylbenzenes is disclosed in U.S. Pat. No. 2,746,990 wherein diisopropylbenzene is oxidized to terephthalic acid. The methods for producing terephthalic acid are not however limited to the oxidation of alkylbenzenes and U.S. Pat. Nos. 3,243,457 and 3,096,366 disclose the production of terephthalic acid by the rearrangement of potassium salts of benzoic or phthalic acids. Such rearrangements are generally known as Henkel rearrangements. Regardless of the method of manufacture, the terephthalic acid will generally contain various impurities which are detrimental to polyester production, especially from the standpoint of color. The terephthalic acid produced by the processes now well known will generally have less than about 5 percent by weight of impurities in it. Although all of the troublesome impurities have not been identified, some of the more common impurities are 4-carboxybenzaldehyde, p-toluic acid, o-phthalic acid, m-phthalic acid, and p-acetylbenzoic acid. Of these impurities, 4-carboxybenzalehyde is generally the most troublesome impurity and the amount of that compound has been used extensively as a criterion of effectiveness in purification processes. Of course the specifications for a fiber grade terephthalic acid vary according to the type of polymerization process to be used in forming the polyester and according to the process of manufacturing the terephthalic acid, but the specifications for fiber grade terephthalic acid generally require less than about 50 parts per million 4-carboxybenzaldehyde. In view of the stringent purity requirements the term "crude" terephthalic acid as used herein is not meant to cover only terephthalic acid having large amounts of impurities but is also meant to include terephthalic acid having extremely small but undesirable amounts of impurities. For example, terephthalic acid containing at least 40 parts per million of 4-carboxybenzaldehyde might be too impure for some end uses and thus could be considered "crude" terephthalic acid as far as the present invention is concerned. "Crude" terephthalic acid as used herein is also intended to cover and include terephthalic acid which may or may not have been subjected to other types of purification processes so as to partially purify the terephthalic acid.

Various processes have been devised to treat terephthalic acid for the removal of organic impurities and other impurities contributing to the quality and color of polyesters. Some of these processes include activated charcoal treatment of solutions of water soluble salts, alkaline oxidation with hypohalite or permanganate solutions of water soluble salts, water leaching, and treatment of aqueous solutions of alkaline salts with carbon monoxide. It has also been disclosed in such patents as U.S. Pat. No. 2,923,736, that crude terephthalic acid may be purified by sublimation followed by fractional condensation of the terephthalic acid from the resulting gas. However these purification processes have generally not proved to be sufficient or economical enough from the standpoint of commercial production to produce a fiber grade terephthalic acid and it is for this reason that it has generally been necessary to go the dimethyl terephthalate route to polyesters.

SUMMARY

It is thus an object of the present invention to provide a process for the purification of impure terephthalic acid. It is a further object of the present invention to provide a process for the purification of crude terephthalic acid so as to produce a terephthalic acid suitable for fiber forming. Another object of the present invention is to provide a process for the reduction of impurities such as 4-carboxybenzaldehyde in an impure terephthalic acid. Additional objects will become apparent from the following description of the present invention.

These and other objects are accomplished by the present invention which in one of its embodiments is a method for improving the purity of a crude terephthalic acid comprising (1) heating crude terephthalic acid and an inert liquid medium to a temperature of at least 325°C, said temperature being one at which no more than about 50 percent of the terephthalic acid remains as a solid, the pressure being sufficient to maintain a liquid phase at temperatures below the critical temperature, (2) cooling the terephthalic acid and liquid medium so as to crystallize terephthalic acid and (3) recovering the thus crystallized, purified terephthalic acid. By the term "pressure being sufficient to maintain a liquid phase at temperatures below the critical temperature" is meant that if the required heating above 325°C does not exceed the critical temperature of the liquid phase present, then the pressure must be sufficient to maintain this liquid phase. Likewise, if the critical temperature is exceeded, then the pressure must be at least that which would cause a liquid phase to exist if the temperature were lowered to the critical temperature. Although applicant does not wish to be bound by any particular theory, it appears that many of the undesirable impurities, and in particular the 4-carboxybenzaldehyde impurities, are being selectively destroyed or decomposed during the heating step of the present invention. The products of the decomposition either remain in the mother liquor during recrystallization or remain in the terephthalic acid as impurities which are not especially harmful or undesirable. Regardless of the mechanism involved, the present process does provide purification above a recrystallization process wherein for example a 5 percent slurrry of terephthalic acid is merely heated to a temperature sufficient to dissolve it (such as about 250°C) followed by recrystallization.

DESCRIPTION OF THE PREFERRED EMBODIMENTS

As may be seen from the above, the present invention calls for heating crude terephthalic acid at temperatures above 325°C such that no more than 50 percent of the crude acid remains as a solid although best results are obtained when no more than 25 percent remains as a solid and it is preferred that the heating be to a temperature such that none of the terephthalic acid remains as a solid. Since the heating step of the present invention is also limited to pressures sufficient to maintain a liquid phase at temperatures less than the critical temperature of the liquid phase, this means that at least about 50 percent (and preferably 100 percent) of the terephthalic acid must be in the liquid phase (or in a gas phase which is an equilibrium with the liquid phase) if the critical temperature is not exceeded during the heating step. Whether this liquid phase which is present in some embodiments of the present invention is a solution of terephthalic acid in the inert liquid medium, is a solution of the inert liquid medium in the terephthalic acid or is merely a eutectic mixture of the two is not always clear. In some cases such as when the terephthalic acid is present in only very small percentages, it appears that the terephthalic acid does actually go into solution in the liquid medium. However, when treating a mixture containing for example 85 percent terephthalic acid and 15 percent liquid medium such as might be present in a wet filter cake, it is not exactly clear what the liquid phase should be called. As pointed out above when operating the present invention such that a liquid phase is present, there might or might not be a gas phase in equilibrium with the liquid phase depending on the method used for heating. For example, if one started heating a liquid-solid slurry at autogenous pressure in a closed container which was completely filled with the liquid-solid slurry, one should have only a single liquid phase present or a liquid-solid two phase system present unless the critical temperature of the liquid phase was exceeded. It has also been observed in runs made in sealed capillary tubes that when one starts heating a sealed tube which is less than completely full but is over about half-full of liquid (or liquid-solid slurry), the liquid phase will sometimes expand to completely fill the tube before the critical temperature is reached. Thus in these situations a two-phase system is converted to a single phase system prior to reacting the critical temperature. In other runs made in sealed tubes wherein the tubes were less than half-full of liquid prior to heating, it was generally observed that a gas phase remained in equilibrium with the liquid phase until the critical temperature was reached at which time the interface between the gas phase and liquid phase would disappear.

The pressure limitation called for in the present process also means that if the critical temperature is exceeded, then at least 50 percent (and preferably 100 percent) of the terephthalic acid and the inert liquid medium must exist as a single plasma-like phase. The term "plasma-like phase" is used in describing the physical state of a material which has been heated above the critical temperature since the material does not really seem to behave like a true gas but instead seems to have properties of both a liquid and a gas.

The actual final physical state of the material being heated and its physical state during the heating will of course vary according to the amount of terephthalic acid initially present, the liquid medium being used, and the final temperature reached during heating. Thus in heating a slurry of crude terephthalic acid and liquid medium in accordance with the present invention, all of the acid might go into solution in the liquid medium before 325°C is reached, in which case one would continue heating the solution to a final treatment of at least 325°C or higher, which final treatment temperature might or might not be above the critical temperature of the liquid phase. At this point the applicant would like to point out that the treatment temperatures actually used in the present invention should generally be within the range of about 325° to 440°C. The heating period required for the process of the present invention, i.e., the length of time the temperature must be held at the required temperature of 325°C or above, may vary widely and will depend on the particular temperature being utilized, the amount of impurities present, the degree of purification desired, etc. For a given treatment temperature the reduction of impurities increases with time; likewise, for a given length of time the reduction of impurities will increase as the temperature is increased. Although an increase in the time of heating above 325°C will result in a greater reduction of impurities, it has also been found that some terephthalic acid will decompose at these high temperatures. Therefore to avoid excessive losses of terephthalic acid by decomposition the heating period should generally be less than about 2 hours, for example from 10 seconds to 2 hours and is preferably from about 2 minutes to 30 minutes at temperatures of from 340°C to 420°C.

Going back to the various things that might take place when treating a mixture of crude terephthalic acid and inert liquid medium in accordance with the present invention, one might find upon reaching 325°C that more than 50 percent of the crude terephthalic acid remained as a solid so that the temperature must necessarily be raised above 325°C until at least 50 percent of the crude acid solid does disappear. Usually as one heats the mixture, all of the solid acid will disappear while there is still a liquid phase present, in other words before the critical temperature is reached. However, some observations have been made wherein it appeared that as the temperature of a mixture was increased, more and more of the solid terephthalic acid went into solution in the liquid medium (or formed a eutectic mixture or the like) but that the critical temperature of the liquid phase present was reached before all of the solid phase had disappeared. Thus a solid phase was present together with a plasma-like phase. When heating was continued the remaining solid gradually disappeared such that only a plasma-like phase was present. As those skilled in the art are well aware, it is extremely difficult to make observations at the critical point and at the temperatures involved in the present invention; therefore applicant does not wish to be bound by the foregoing observations.

The actual pressures developed in the heating step of the present invention may be relatively high since they must be at least that pressure which will maintain a liquid phase at temperatures below the critical. These pressures will of course vary according to the particular liquid medium being used, the final temperature of heating and the like. If the boiling point of the liquid medium is above the treatment temperature then atmospheric pressure will be sufficient but for most liquids the pressure will be above 100 psig. The process of the present invention is most conveniently operated at autogenous pressure, the volume of the system used for heating the desired volume of terephthalic acid in liquid medium being of course small enough that sufficient pressures are developed. Nitrogen or other gases such as $CO_2$ may be added in order to maintain the desired pressure.

The process of the present invention may be carried out batchwise or in a continuous system and may be conducted in various types of equipment of various materials of construction, e.g., glass, stainless steel or titanium alloys. The crystallization called for in the present invention may be effected for example by merely cooling the solution such as in a tank crystallizer or may be effected in various other types of equipment such as crystallizing evaporators or vacuum crystallizers. The cooling during crystallization should generally be at least below 200°C and is preferably below 100°C in order to insure optimum recovery of the terephthalic acid. The mixture of crude terephthalic acid in liquid medium to be treated by this process will generally be in the form of a slurry or other mixture wherein the terephthalic acid is present as a solid. These slurries or other mixtures can be formed such as by adding crude terephthalic acid crystals to the liquid medium. The process of the present invention can also be applied to mixtures of terephthalic acid and liquid medium which have been preheated to a temperature below the desired treatment temperature and are already at a temperature such that the terephthalic acid is in solution in the liquid medium. Also the process of the present invention may be operated such as by preheating the liquid medium alone to temperatures below or above 325°C and then combining it with the crude terephthalic acid. In the process of the present invention, the crude terephthalic acid should be generally present in amounts of from about 3 to 95 percent based on the combined weight of the liquid medium and the crude terephthalic acid, preferably about 5 to 50 percent by weight.

The inert, liquid medium to be used in the present invention should be one which has a boiling point above 20°C and a melting point below 200°C and can be water, organic compounds or mixtures of organic compounds and water. Water alone is the least preferred medium so that it might be stated that the inert, liquid medium will be usually comprised of an organic compound (i.e., organic compounds alone or combined with water). By "inert" is meant that the liquid medium is one which does not react with the terephthalic acid to any appreciable extent under the conditions of the process and one which is not destroyed to any appreciable extent under the conditions of the process such as by reacting with itself, polymerizing, etc. When the amount of crude terephthalic acid is present in large amounts it has been found that more water is preferably present than when the crude terephthalic is present in small amounts. Thus if the mixture of terephthalic acid in liquid medium to be treated contains above 50 percent by weight, e.g., 50 to 95 percent, of terephthalic acid based on the combined weight of terephthalic acid and liquid medium, the inert liquid medium is preferably comprised of from about 10 to 100 percent by weight of water and 0 to 90 percent by weight of an organic medium. When the mixture contains above 75 percent terephthalic acid the inert liquid medium should contain at least 20 percent by weight water. When the terephthalic acid is present in the mixture to be treated in amounts of less than 50 percent by weight, the liquid medium preferably comprises from about 0 to 75 percent, preferably 0 to 20 percent, by weight of water and 25 to 100 percent, preferably 80 to 100 percent, by weight of an organic medium. Usually the organic medium utilized will be a member selected from the group consisting of $C_5+$ hydrocarbons, $C_2+$ halohydrocarbons, carboxylic acids, hydrocarbon ethers, halohydrocarbon ethers, and mixtures thereof. Regardless of the composition of the liquid medium it is generally best that at least a portion of it be a carboxylic acid. By "$C_5+$ hydrocarbons" is meant those having five or more carbon atoms while "$C_2+$ halohydrocarbons" is intended to cover those having two or more carbon atoms. Of the hydrocarbons and halohydrocarbons that may be used, aromatics are preferred. Examples of suitable hydrocarbons, ethers, and halohydrocarbons include naphthalene, tetralin, diphenyl, xylene, benzene, dicyclopentadiene, cumene, n-hexane, cyclohexane, 2-methylheptane, the dodecanes, bibenzyl, chlorotoluene, diphenyl ether, ethylene glycol ether, chlorinated biphenyls, chlorinated naphthalenes, polyphenylene oxides, polyoxyethylenediols, chlorinated diphenyl ethers, $C_{10}$ aromatic isomers, and the like. Of the carboxylic acids, the lower ($C_1$ to $C_7$) aliphatic carboxylic acids such as formic, acetic, butyric, and propionic are preferred with acetic being preferred over the others. Other carboxylic acids which may be used include benzoic acid, phenylacetic, chlorobenzoic acid, and chloroacetic acid. It is preferred to treat mixtures of terephthalic acid and liquid medium containing about 3–35 percent by weight of terephthalic acid and the preferred liquid medium for use in such cases is one consisting essentially of from 85 to 100 percent by weight of a $C_2$–$C_4$ aliphatic carboxylic acid and from 0 to 15 percent by weight of water or the particularly excellent medium comprised of a mixture of xylene and a carboxylic acid disclosed and claimed in copending application Ser. No. 705,601, filed Feb. 15, 1968.

The crude terephthalic acid to be treated according to the present invention may be derived from various sources and may be terephthalic acid which has been subjected to previous types of purification treatment. In general, the present invention is most useful in the purification of crude terephthalic acid derived from the oxidation of alkylbenzenes or from the rearrangement of inorganic salts of benzene carboxylic acids, however, best results are obtained when treating impure or crude terephthalic acid derived from the oxidation of p-xylene with an oxygen-containing gas. Whatever the source of the terephthalic acid, it can be stated that the present invention is useful in treating crude terephthalic acid containing 4-carboxybenzaldehyde, p-toluic acid, o-phthalic acid, m-phthalic acid, and p-acetylbenzoic acid or mixtures thereof although it is most useful in removing 4-carboxybenzaldehyde impurities. As was pointed out above, terephthalic acid produced by the present well known processes will generally have less than about 5 percent by weight of impurities and quite frequently less than 1 percent by weight impurities. It should be kept in mind that the thermal treatment step of the present invention does not remove or decompose all types of impurities, e.g., various metal impurites, which may be found in a crude terephthalic acid, and thus the present process may be combined with other purification treatments such as simple recrystallizations. For example, when treating a mixture of 85 percent crude acid and 15 percent liquid medium in accordance with the present invention, it may be desirable to add additional liquid medium after the thermal treatment step and before the terephthalic acid is crystallized so as to quench and/or so that the crystallization will be from a more dilute solution and thus remove more of the impurities that are amenable to separation from the acid by crystallization from a solution. Instead of adding the liquid medium after the thermal treatment, the acid could first be crystallized, recovered, then redissolved and recrystallized from a solvent.

It has also been found that the process of the present invention can be enhanced by the use of catalysts. For example, it has been found that when a alkali metal catalyst is present in amounts sufficient to provide from 0.001 to 6 percent by weight of the alkali metal, based on the combined weight of the terephthalic acid, and the liquid medium, the heating period to obtain a particular degree of purification under a given set of conditions may be reduced. The alkali metal catalysts are conveniently added as a soluble alkali metal compound such as the alkali metal salts of carboxylic acids or of inorganic acids. Some suitable alkali metal compounds include sodium acetate, sodium phosphate, lithium acetate, lithium phosphate, potassium propionate, potassium acetate, sodium hydroxide, sodium bicarbonate, lithium terephthalate, and sodium carbonate. Preferably these catalysts are present in amounts sufficient to provide from 0.1 to 2 weight percent of the alkali metal based on the combined weight of terephthalic acid and inert liquid medium present with sodium phosphate and sodium acetate being the preferred sources of the alkali metal. Other catalysts which may be used are those compounds, complexes, etc., providing a metal from Group I-B, II- or VIII of Mendelyeev's Periodic Table. These latter catalysts are disclosed and claimed in copending application Ser. No. 705,616, filed Feb. 15, 1968. Some specific catalysts disclosed in the copending application include cobalt acetate, palladium acetate, zinc chloride, copper propionate, and the like. When using some of these catalysts, that is the Group VIII noble metal catalysts, the treatment temperature can be lowered to 275° C or less.

The following examples are given in order to illustrate but not to limit the present invention. All percentages and ratios are by weight unless otherwise specified.

EXAMPLE I

To a 65 milliliter stainless steel autoclave are charged 35 milliliters of a slurry consisting of about 80 percent by weight of acetic acid and 20 percent by weight of crude terephthalic acid. The crude terephthalic acid is one prepared by the air oxidation of p-xylene in the presence of a heavy metal catalyst and the crude acid contains about 2.1 percent by weight of 4-carboxybenzaldehyde and 3.5 percent by weight of p-toluic acid. The slurry is heated at autogenous pressure to a temperature of 330°C at which temperature all of the terephthalic acid is in solution in the acetic acid. After holding the temperature at about 330°C for 3 hours the temperature is reduced so as to crystallize the terephthalic acid and the terephthalic acid crystals are recovered by filtration, washed with water, dried and analyzed. Analyses of the large needle-like crystals show the terephthalic acid to contain about 0.11 percent by weight of 4-carboxybenzaldehyde and about 0.34 percent by weight of p-toluic acid.

EXAMPLE II

The process of Example I is repeated except that the slurry contains 0.2 percent by weight of lithium acetate. The recovered terephthalic acid contains only 340 ppm 4-carboxybenzaldehyde and 0.15 percent by weight of p-toluic acid.

EXAMPLE III

A small glass vessel of 20 milliliters volume is charged with 2 grams crude terephthalic acid and 10 milliliters water. The crude terephthalic acid contains about 2.1 percent by weight carboxybenzaldehyde and 3 percent by weight p-toluic acid. The glass vessel is then sealed, placed in a rocking autoclave and heated with rocking to a temperature of 350° to 360°C such that all of the terephthalic acid is in solution. After maintaining the temperature at 350° to 360°C for 2 hours the solution is cooled so as to crystallize the terephthalic acid. The recovered terephthalic acid contains about 253 ppm 4-carboxybenzbenzaldehyde and 400 ppm p-toluic acid.

EXAMPLE IV

The experiment of Example III is repeated except that the 20 milliliter glass vessel is charged with 2 grams of terephthalic acid, 10 milliliters acetic acid, 0.2 grams sodium acetate and 100 microliters of water. The recovered terephthalic acid contains about 147 ppm 4-carboxybenzaldehyde and 160 ppm p-toluic acid.

EXAMPLE V

Crude terephthalic acid containing about 0.4 percent by weight of 4-carboxybenzaldehyde impurity is added to a liquid medium consisting of 95 weight percent of acetic acid and 5 weight percent of water so as to form a slurry containing about 15 weight percent crude terephthalic acid. Sodium acetate is also added in an amount sufficient to cause the slurry to contain 0.2 percent by weight of sodium. A small glass tube of about 20 milliliters volume is then charged with about 10 milliliters of the slurry and sealed. The sealed tube is then quickly heated to a temperature of approximately 380°C at which temperature all of the crude terephthalic acid is in solution in the liquid medium. The 380°C temperature is maintained for 5 minutes at which time the tube is cooled so as to crystallize the terephthalic acid and the terephthalic acid crystals are recovered and analyzed. Analysis shows the recovered terephthalic acid to contain about 38 ppm 4-carboxybenzaldehyde, 40 ppm p-toluic acid, and less than 5 ppm isophthalic acid.

EXAMPLE VI

Several runs are made in which crude terephthalic acid containing about 0.4 percent by weight (4,000 ppm) of 4-carboxybenzaldehyde impurity is added to different liquid mediums to form a slurry. Some of the slurries also contain a catalyst. About one-half milliliter of the slurry is then charged to a small glass tube of about 1 milliliter volume and the glass tube sealed. The glass tube is then quickly heated to the desired temperature for the desired period of time and then cooled so as to crystallize the terephthalic acid from liquid solution. The composition of the slurries, the treatment conditions and the results of these runs may be seen in the following table. In the table, "TPA" stands for terephthalic acid, "AcOH" stands for acetic acid, "NaOAc" stands for sodium acetate and "CBA" stands for 4-carboxybenzaldehyde in the product. All percentages and ratios are on a weight basis.

Three capillary tubes were filled about half-full of a slurry containing about 10 percent by weight of crude terephthalic acid and 90 percent by weight of a liquid consisting of a mixture of 95 percent acetic acid and 5 percent water. The crude terephthalic acid contained about 4,500 ppm of 4-carboxybenzaldehyde (4-CBA). The tubes were sealed and then the first of these tubes was heated quickly to about 280°C so as to completely dissolve the crude terephthalic acid. As soon as dissolution had occurred the tube and solution therein was quickly cooled to below 100°C so as to crystallize the terephthalic acid from solution and then these crystals were washed with water and analyzed.

The second of these tubes was quickly heated to 310°C (at which temperature the crude diacid was dissolved) and maintained at that temperature for about 45 minutes. Following the heating period the tube was cooled and the terephthalic acid crystals recovered and analyzed in the same manner as for the first tube.

The third of these tubes was quickly heated to about 375°C and maintained at that temperature for about 10 minutes and then the tube cooled and the terephthalic acid crystals recovered and analyzed in the same manner as utilized for the first and second tubes.

The analysis of the terephthalic acid recovered from the first tube, which represented a recrystallization purification, showed the terephthalic acid to have a 4-CBA content of 420 ppm. Analysis of the contents of the second tube, which involved a recrystallization purification (although at temperatures higher than utilized in recrystallization processes of the prior art) plus a heating period of 45 minutes at 310°C, showed the 4-CBA content of the terephthalic acid to be 420 ppm. Thus the prolonged heating at 310°C did not serve to reduce the impurities below that value obtained by ordinary recrystallization.

TABLE

| | Slurry Composition | | | Conditions | | Product |
|---|---|---|---|---|---|---|
| Run No. | TPA | Liquid | Catalyst | Temp. °C | Time, min. | CBA, ppm |
| 1 | 20% | 76% AcOH 4% H$_2$O | | 340 | 30 | 300 |
| 2(a) | 20% | 76% AcOH 4% H$_2$O | | 420 | 3 | 19 |
| 3 | 20% | 76% AcOH 4% H$_2$O | | 400 | 30 | <2 |
| 4 | 10% | 90% Tetralin | | 420 | 30 | 40 |
| 5 | 10% | 90% Biphenyl | | 400 | 25 | 105 |
| 6 | 10% | 90% Benzoic acid | | 400 | 25 | 300 |
| 7 | 15% | 81% AcOH 4% H$_2$O | | 380 | 5 | 94 |
| 8 | 15% | 80% AcOH 4% H$_2$O | 1% NaOAc | 380 | 5 | 38 |
| 9 | 15% | 85% p-Xylene | | 360 | 10 | 432 |
| 10 | 15% | 85% AcOH | | 360 | 10 | 300 |
| 11 | 80% | 20% AcOH | | 400 | 5 | 45 |
| 12 | 80% | 18% AcOH | 2% NaOAc | 400 | 3 | 70 |
| 13 | 90% | 10% Tetralin | | 430 | 3 | 182 |
| 14 | 90% | 10% p-Xylene | | 430 | 3 | 375 |
| 15 | 90% | 10% Diphenyl acetic acid | | 430 | 3 | 329 |
| 16 | 90% | 10% H$_2$O | | 420 | 10 | 714 |
| 17 | 90% | 9% H$_2$O 1% AcOH | | 420 | 5 | 558 |
| 18 | 90% | 7% H$_2$O 3% AcOH | | 420 | 5 | 504 |
| 19 | 90% | 7% H$_2$O 3% AcOH | | 420 | 15 | 118 |
| 20 | 90% | 7% H$_2$O | 3% NaOH | 420 | 15 | 668 |

(a) CO$_2$ atmosphere

However the contents of the third tube, which had been treated in accordance with the present invention, contained only about 100 ppm of 4-CBA. It may be seen that the third tube treated in accordance with the present invention not only received the benefits of the recrystallization purification (which would have lowered the 4-CBA to about 420 ppm) but also reduced the 4-CBA content an additional 320 ppm. Thus the product recovered from the treatment of a slurry according to the present process, as was pointed out above, has less impurities than a simple recrystallization of the same slurry, the period of heating at the required temperature generally being directly proportional to the increased purification.

EXAMPLE VIII

A slurry of 15 percent by weight of crude terephthalic acid containing 0.45 percent 4-carboxybenzaldehyde (4-CBA) and 85 percent by weight of a 95:5 acetic acid-water mixture was prepared. The 15 percent slurry was added to each of two identical tubes such that the slurry occupied 18 percent of the total volume of the first tube and 69 percent of the total volume of the second tube. The tubes were then sealed, quickly heated to 390°C (above critical) for 5 minutes. In both cases the tubes were completely filled by the supercritical fluid during the 5 minutes heating time so that the expansion ratio of the material in the first tube was 5.6 times its original volume and was 1.45 times its original volume in the second tube. After the 5 minutes heating the tubes were cooled to crystallize the terephthalic acid which was then washed and analyzed. The terephthalic acid from the first tube contained about 320 ppm of 4-CBA and that of the second tube contained only 104 ppm. This example shows that in the present process, 4-CBA degradation appears to be faster at lower expansion ratios.

In order to prevent corrosion in metal vessels such as those constructed of stainless steel, a soluble phosphorus compound may be present in the process. A very wide variety of phosphorus compounds may be used but generally speaking the phosphorus compounds which are desirably present have a phosphorus atom linked to at least one oxygen or sulfur atom, preferably oxygen. This includes the addition of compounds to the process which already have a phosphorus-oxygen or phosphorus-sulfur linkage (such as orthophosphoric acid, triethyl phosphine oxide and phosphorus pentasulfide) or those which will form under the conditions of the process a compound or ion containing such a linkage. Some types of compounds which are desirable include the oxyacids of phosphorus, metal salts of the oxyacids of phosphorus, esters of the oxyacids of phosphorus, oxides of phosphorus and sulfides of phosphorus. Examples of the foregoing include orthophosphoric acid, pyrophosphoric acid, phosphoranedioic acid, orthophosphorus acid, hypophosphorus acid, monopotassium phosphate, trisodium phosphate, sodium acid orthophosphite, dipotassium pyrophosphite, tri-n-butyl phosphite, dimethyl methylphosphonate, triethyl phosphate, tricresyl phosphate, propyl phosphoric acid, ethyl diethylphosphinite, diethylphosphinic acid, ethylphosphonic acid, ethyl diethylphosphinate, triethyl phosphine oxide, phosphorus trioxide, phosphorus pentoxide, phosphorus tetrasulfide, and the like. When an alkali metal salt of a phosphorus acid, such as $Na_3PO_4$, is used as the source of the phosphorus, such a salt will also serve as the source of alkali metal which acts as a catalyst as pointed out above. Extremely wide amounts of a phosphorus compound may be utilized in the present invention, for example from amounts of about 1 ppm to amounts of 50,000 ppm based on the combined weight of the crude terephthalic acid and liquid medium.

The embodiments of the invention in which an exclusive property or privilege is claimed are defined as follows:

1. A method for improving the purity of a crude terephthalic acid produced by the liquid-phase oxidation of p-xylene with an oxygen-containing gas and containing impurities comprising 4-carboxybenzaldehyde, which method comprises:
   a. heating a mixture consisting essentially of said crude terephthalic acid and an inert liquid medium non-catalytically to a temperature of at least 325°C, said temperature being one at which no more than about 50 percent of the terephthalic acid remains as a solid, the pressure being sufficient to maintain a liquid phase at temperatures below the critical temperature,
   b. cooling the terephthalic acid and liquid medium so as to crystallize terephthalic acid and
   c. recovering the thus crystallized, purified terephthalic acid having a 4-carboxybenzaldehyde content lower than that of said crude terephthalic acid.

2. The process of claim 1 wherein the heating is continued until none of the terephthalic acid remains as a solid.

3. The process of claim 1 wherein the crude terephthalic acid is present in amounts of from about 3 to 95 percent by weight based on the combined weight of crude terephthalic acid and inert, liquid medium.

4. The process of claim 1 wherein the temperature of heating is from about 325°C to 440°C.

5. The process of claim 1 wherein said crude terephthalic acid has been produced by the oxidation of p-xylene with air.

6. The process of claim 1 wherein the heating above 325°C is for at least 2 minutes.

7. The process of claim 1 wherein said heating is continued for a period of time such that the recovered, purified terephthalic acid contains less impurities than that obtained in a simple recrystallization process wherein the crude terephthalic acid and inert liquid medium are heated to a temperature sufficient to dissolve the crude terephthalic acid followed by cooling the resulting solution to recrystallize the terephthalic acid, and wherein said inert liquid medium has a boiling point of at least 20°C and a melting point of less than about 200°C and comprises an organic medium.

8. The process of claim 7 wherein the terephthalic acid is present in amounts of from about 5 to 50 percent by weight based on the combined weight of crude terephthalic acid and inert liquid medium and wherein said inert liquid medium comprises from about 0 to 75 percent by weight water and from about 25 to 100 percent of a member selected from the group consisting of $C_5+$ hydrocarbons, $C_2+$ halohydrocarbons, carboxylic acids, hydrocarbon ethers, halohydrocarbon ethers, and mixtures thereof.

9. The process of claim 8 wherein said heating is at least to a temperature such that none of the terephthalic acid exists as a solid.

10. The process of claim 9 wherein the heating is at a temperature of from about 340° to 420°C.

11. The process of claim 10 wherein the inert liquid medium comprises from 0 to 15 percent by weight of water and from 85–100 percent by weight of a $C_2$–$C_4$ aliphatic carboxylic acid.

12. The process of claim 7 wherein the crude terephthalic acid is present in amounts of from about 50 to 95 percent by weight based on the combined weight of crude terephthalic acid and inert liquid medium and wherein said inert liquid medium comprises from about 10 to 100 percent by weight of water and 0 to 90 percent by weight of a member selected from the group consisting of $C_5+$ hydrocarbons, $C_2+$ halohydrocarbons, carboxylic acids, hydrocarbon ethers, halohydrocarbon ethers, and mixtures thereof.

13. The process of claim 12 wherein the heating is continued until none of the terephthalic acid remains as a solid.

14. The process of claim 13 wherein the heating is to a temperature of 340° to 420°C.

15. The process of claim 13 wherein said liquid medium consists essentially of from 10 to 100 percent by weight of water and 0 to 90 percent by weight of an aliphatic carboxylic acid.

16. A method for improving the purity of a crude terephthalic acid produced by the liquid-phase oxidation of p-xylene with an oxygen-containing gas and containing impurities comprising 4-carboxybenzaldehyde, which method comprises:
 a. heating crude terephthalic acid, an inert liquid medium, and a catalyst consisting essentially of an alkali metal salt of a carboxylic acid or an inorganic acid to a temperature of at least 325°C, said temperature being one at which no more than about 50 percent of the terephthalic acid remains as a solid, the pressure being sufficient to maintain a liquid phase at temperatures below the critical temperature,
 b. cooling the terephthalic acid and liquid medium so as to crystallize terephthalic acid and
 c. recovering the thus crystallized, purified terephthalic acid.

17. The process of claim 16 wherein the catalyst is an alkali metal salt of a carboxylic acid.

18. The method of claim 16 wherein the catalyst is sodium acetate.

* * * * *